(12) United States Patent
Lindner et al.

(10) Patent No.: US 7,525,666 B2
(45) Date of Patent: Apr. 28, 2009

(54) INTERFEROMETRIC MEASURING DEVICE

(75) Inventors: Michael Lindner, Leutenbach (DE); Vincent Thominet, Morges (CH); Bernd Schmidtke, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 366 days.

(21) Appl. No.: 10/542,743

(22) PCT Filed: Jan. 20, 2004

(86) PCT No.: PCT/DE2004/000065

§ 371 (c)(1), (2), (4) Date: Apr. 12, 2006

(87) PCT Pub. No.: WO2004/065897

PCT Pub. Date: Aug. 5, 2004

(65) Prior Publication Data

US 2006/0238774 A1    Oct. 26, 2006

(30) Foreign Application Priority Data

Jan. 20, 2003  (DE)  ............................. 103 01 820
Jun. 12, 2003  (DE)  ............................. 103 26 580

(51) Int. Cl.
*G01B 11/02*  (2006.01)
(52) U.S. Cl. .................................... 356/511; 356/497
(58) Field of Classification Search ............... 356/479, 356/497, 511, 512
See application file for complete search history.

(56) References Cited

U.S. PATENT DOCUMENTS 5,684,545 A    11/1997  Dou et al.
6,338,559 B1 *  1/2002  Williams et al. ............ 351/212
6,485,413 B1   11/2002  Boppart et al.
6,588,900 B1 *  7/2003  Le Gargasson et al. ..... 351/200
6,634,750 B2 * 10/2003  Neal et al. .................. 351/211

(Continued)

FOREIGN PATENT DOCUMENTS

DE        197 33 193        2/1999

(Continued)

OTHER PUBLICATIONS

T. Dresel, G. Häusler and H. Venzke, Applied Optics vol. 31 (1992), p. 919.

(Continued)

*Primary Examiner*—Patrick J Connolly
(74) *Attorney, Agent, or Firm*—Kenyon & Kenyon LLP

(57) ABSTRACT

An interferometric measuring device, especially for measuring the shape of a surface of an object, includes a radiation source emits a short coherent electromagnetic radiation, a component, in particular a beam splitter, to form an object beam that is guided to the object via an object light path, and a reference beam guided to a reference plane via a reference light path, and a pickup element, by the use of which an electromagnetic radiation, that is reflected by the object and the reference plane and brought to interference, is able to be picked up. In this context, an adaptive optical element is provided, with the aid of which the imaging of the object on the pickup element and/or the wave front of the reference beam and/or the optical path length in the reference light path and/or in the object light path may be influenced.

18 Claims, 7 Drawing Sheets

U.S. PATENT DOCUMENTS

| | | | |
|---|---|---|---|
| 6,771,417 B1* | 8/2004 | Wolleschensky et al. | 359/368 |
| 6,849,841 B2* | 2/2005 | Byren et al. | 250/201.9 |
| 7,364,296 B2* | 4/2008 | Miller et al. | 351/206 |
| 2006/0033933 A1* | 2/2006 | Feierabend et al. | 356/512 |
| 2006/0058682 A1* | 3/2006 | Miller et al. | 600/476 |

FOREIGN PATENT DOCUMENTS

| | | |
|---|---|---|
| DE | 101 31 778 | 7/2001 |
| DE | 100 47 495 | 10/2001 |
| DE | 101 15 524 | 11/2001 |
| WO | 00/59368 | 10/2000 |

OTHER PUBLICATIONS

P. de Groot and L. Deck, "Surface profiling by analysis of white light interferograms in the spatial frequency domain," Journal of Modern Optics, vol. 42 (1995), pp. 389 to 501.

* cited by examiner

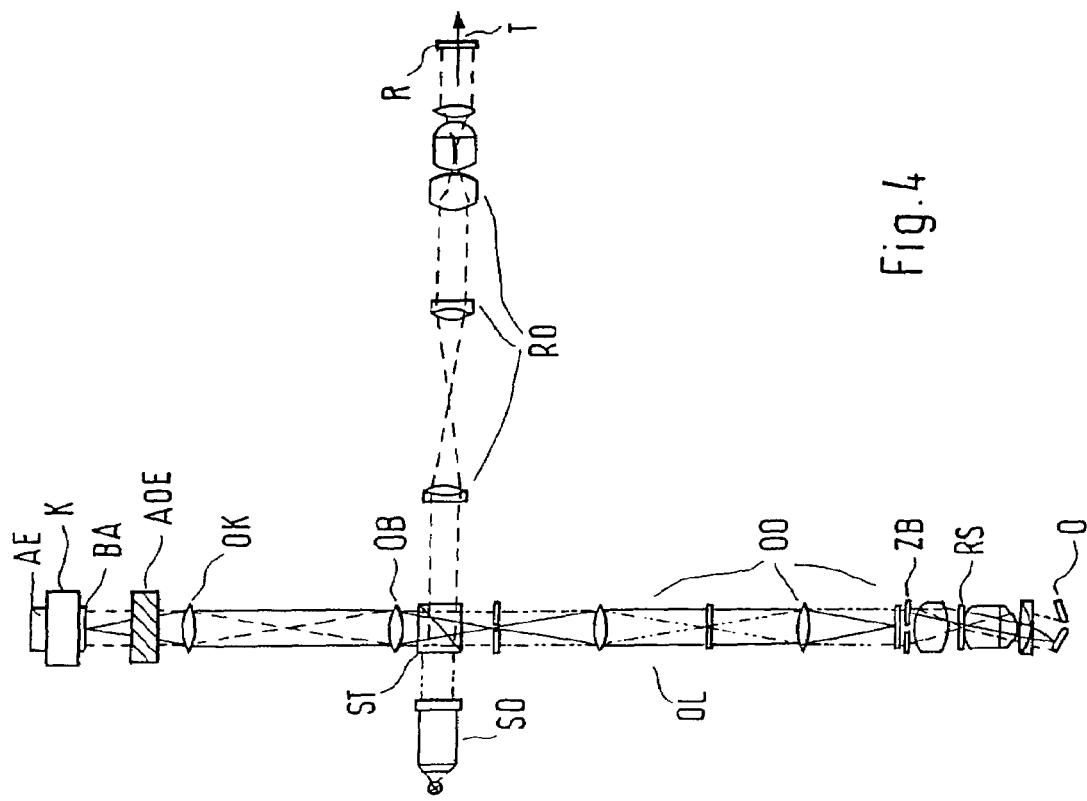
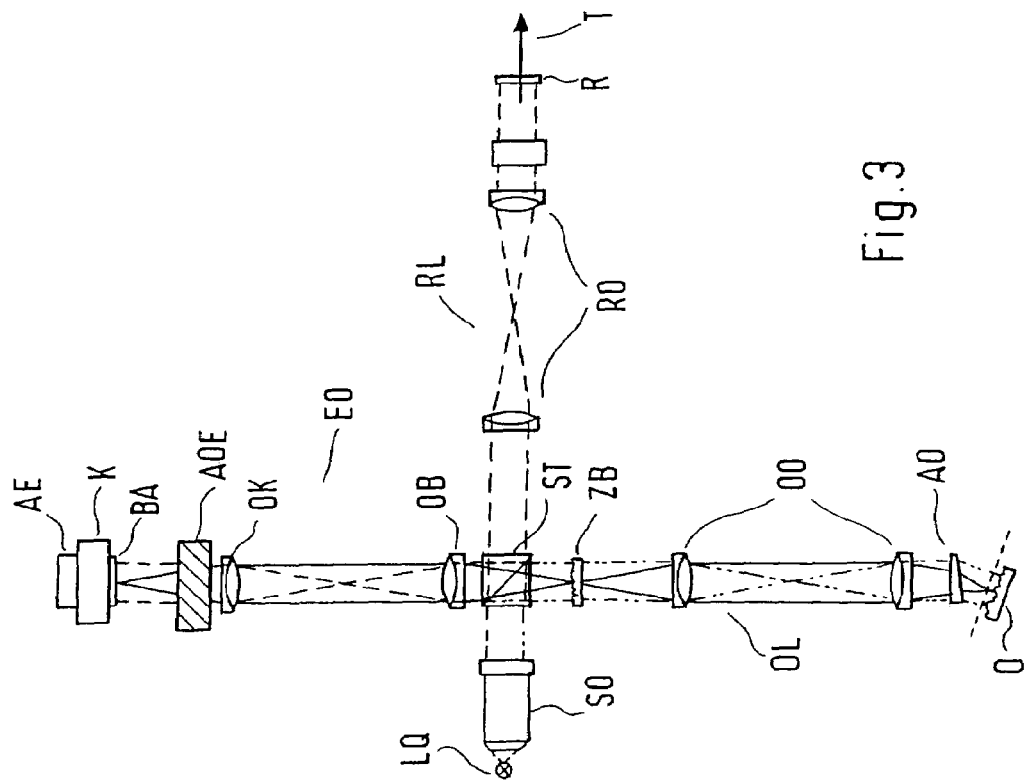

INTERFEROMETRIC MEASURING DEVICE

FIELD OF THE INVENTION

The present application relates to an interferometric measuring device especially for measuring the shape of a surface of an object, having a radiation source that emits a short-coherent electromagnetic radiation, a component, in particular a beam splitter, to form an object ray that is guided to the object via an object light path, and a reference beam guided to a reference plane via a reference light path, and a pickup element by the use of which an electromagnetic radiation that is returned by the object and the reference plane and brought to interference is able to be picked up.

BACKGROUND INFORMATION

Such an interferometric measuring device, referred to as a white light interferometer, offers an interferometric measuring method established under the concept of white light interferometry, in which a short-coherent light source is, as a rule, used in conjunction with a Michelson interferometer. In this regard, we refer, for example, to T. Dresel, G. Haeusler and H. Venzke, Applied Optics vol. 31 (1992), page 919, or P. de Groot and L. Deck, "Surface profiling by analysis of white light interferograms in the spatial frequency domain", Journal of Modern Optics, vol. 42, (1995, pages 389 to 501. In this context, the object is imaged via an objective lens on a CCD camera and superimposed by a flat reference wave. A depth scan of the object surface in the z direction may be carried out as scan of the reference mirror or of the object. In a scan of the object, the image plane of the objective and the reference plane are in the same plane, i.e. the object is only moved in the depth axis relative to the reference plane. In a scan of the reference mirror, on the other hand, only the reference mirror is moved, i.e. the object remains immobile with respect to the objective. In this procedure, the depth measurement range is limited by the depth of field of the objective lens.

A white light interferometer is discussed in German patent document no. 199 48 813 A1 that has an intermediate image of the object in the reference light path. The depth scan, in this context, may be implemented as scan of the reference or as intermediate image scan according to German patent document no. 101 15 524 A1. In a scan of the reference mirror, the reference mirror is moved, i.e. the object remains immobile to the objective. The depth measurement range is limited by the depth of field of the objective lens.

In German patent document no. 101 31 778 A1 a white light interferometer is shown having a panoramic view optical system, i.e. an objective optical system that can take a shot around 360° of a nearly radially symmetrical object region. A depth scan, in this context, may be implemented as scan of the reference or as intermediate image scan according to German patent document no. 101 15 524 A1. In a scan of the reference mirror, the reference mirror is moved here too, i.e. the object remains immobile to the objective in this connection too. The depth measurement range is also limited by the depth of field of the objective lens.

White light interferometers are also known in which a CCD camera may be shifted relative to the ocular lens with the aid of a linear shifting table. This makes it possible to set focusing corrections for different objects or object ranges, in case of the object lies wholly or partially outside the depth of field of the objective. However, this solution is comparatively costly from an apparatus point of view, and in addition it is too inflexible when adjusting the focus.

White light interferometry was able to be developed further by the aforementioned techniques altogether in such a way that, for example, valve seats may be measured completely even in narrow and deep bores.

An important requirement remaining with interferometric measuring devices is, above all in connection with measuring narrow and deep bores, to make different objectives and endoscopes at the measuring device easily exchangeable. Besides that, the measuring range is still restricted by the depth of field range of the objective and the optics of the eyepiece. Finally, in special applications, a depth scan may be carried out only as a scan of the reference mirror, since a scan of the object is technically too costly.

SUMMARY OF THE INVENTION

In the exemplary embodiment of the present invention, at least one adaptive optical element is provided, with the aid of which the imaging of the object on the pickup element and/or the wave front of the reference beam and/or the optical path length in the reference light path and/or the object light path may be influenced.

By the use of the adaptive optical element for imaging the object on the pickup element, such as a CCD camera, in the measuring device according to the present invention, during a depth scan, the object may advantageously remain immobile with respect to the objective optics. Besides, by sweeping over the reference plane of areas of the surface, which extend beyond the respective depth of field ranges, by the use of the adaptive optical element, the object may be imaged sharply again on the pickup element of the CCD camera. In this context, for broad industrial application, it is very advantageous that, during the measurement, the object may be rigid with respect to the objective optics.

An additional advantage is that, also when using different objectives and endoscopes having different fields of view and imaging properties, the different objects may always be sharply imaged on the pickup element by appropriate settings of the adaptive optical element. Thereby, many different measuring tasks may be solved using one interferometer platform.

If the objective or endoscope has an imaging scale greatly different from 1, the required speed of the focusing adjustment may be substantially greater than that of the depth scan. This requirement is substantially easier to implement using an adaptive optical element than, for example, using a movable camera.

In addition, the use of an adaptive optical element offers the advantage that imaging errors of the optical systems such as an endoscope, microobjective or panoramic optical systems may be corrected in an especially simple manner.

In addition, adaptive optical elements may be used, in order, together with an objective optical system, to generate different image planes. Thereby, different depth ranges of the object may be sharply imaged almost simultaneously. The reference arm may have a plurality of reference planes.

Finally, in tomographic measurements, by modifying the focusing in the volume of the object, with the aid of the adaptive optical element, an improvement of the signal-to-noise ratio may be achieved.

This being the case, advantageously objects having a large aperture may be used that have only a slight depth of field. Incidentally, an alternative to this is their implementation using adaptive optical elements, which brings with it additional advantages in the flexibility of the focus.

BRIEF DESCRIPTION OF THE DRAWINGS

FIG. 3 shows a white light interferometer having an adaptive optical element, with the aid of which an inclined object surface is scanned using an intermediate image.

FIG. 4 shows a white light interferometer having an adaptive optical element and a panoramic optical system.

DETAILED DESCRIPTION

The interferometric measuring devices shown in the figures and the measuring method carried out with them are based fundamentally on white light interferometry, a short coherent light source being used. In this context, the electromagnetic radiation in the form of the light is split up via a beam splitter ST into an object light path OL and a reference light path RL, and is conducted, on the one hand, to an object O that is to be measured especially with regard to its surface, and to a reference R, on the other hand. The light reflected back by object O and reference R is superimposed at one location of the common light path, and is guided to an pickup element BA or a pickup element of a camera K. All in all, in this manner, object O is imaged via an objective optical system OB, OO and an ocular optical system OK on pickup element BA of camera K.

During depth scanning or a depth scan of the object surface, object O remains immobile with respect to objective OB or an optical system OO on the object side.

The depth scan takes place, for instance, by the scan of a reference mirror forming reference plane R or by acousto-optical modulators AOM, and, in this context, may also be undertaken in a separate modulation interferometer MI. For the measurement, reference plane R traverses the depth range of objective O that is to be measured. Objective optical system OB, OO has a given depth of field range for this.

If the depth range to be measured is greater than the depth of field range, refocusing is performed using an adaptive optical element AOE. The measurable depth range is therefore independent of the depth of field range.

Adaptive optical elements (AOE) may be implemented by active spatial light modulators such as liquid crystal displays, deformable mirror devices, magneto optic devices or so-called multiple quantum wells (semiconductor heterostructures. In addition, lenses VL, having a variable focus, are also suitable, which are made up of two immiscible fluids 2, 3 and which are activated by a stress, or two counterrotating glass plates DG1, DG2.

As is shown in FIGS. 1 through 8, the interferometer may be implemented differently depending on the measuring task, for instance, as a Michelson interferometer having a scan of reference R or using acousto-optical modulators AOM, as an interferometer having an intermediate image ZB of the object in object light path OL, as an interferometer having a panoramic optical system RO for taking a 360° peripheral object range or as an interferometer having a modulation interferometer MI and an object interferometer OI, the object interferometer OI being able to be designed as a Michelson interferometer or as a common path interferometer, and being able to include optical systems for generating an intermediate image ZB or panoramic optical system RO. Modulation interferometer MI and object interferometer OI may be connected via a general-diffuse optical system or via an optical fiber optical system FO.

Figure 1:
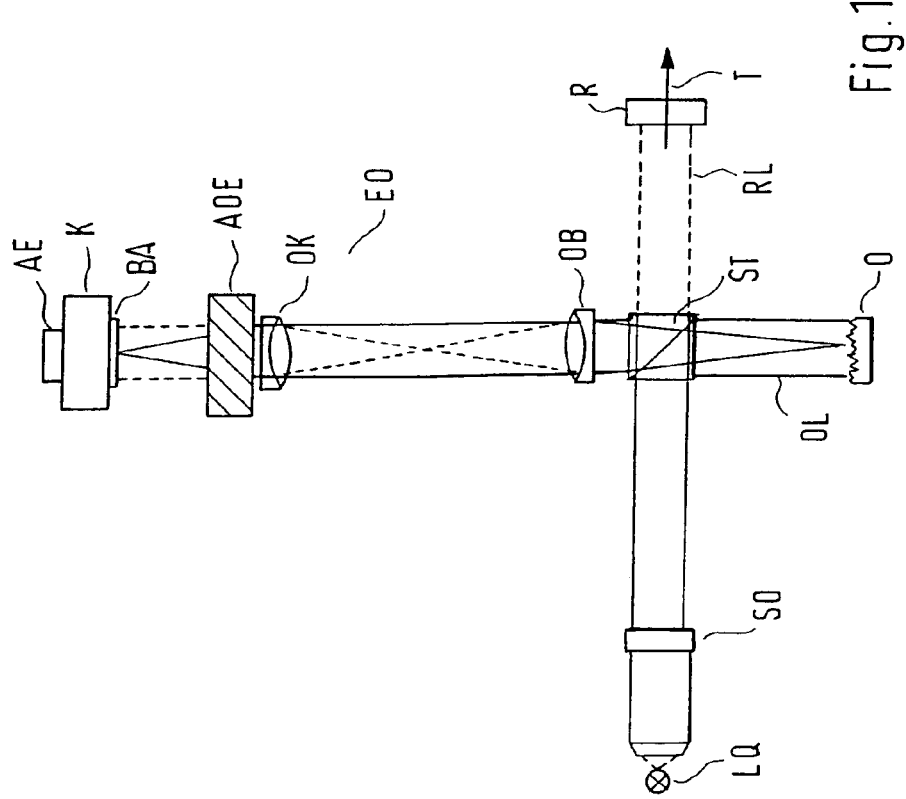
FIG. 1 shows a schematic representation of essential elements of the basic construction of a white light interferometer having an adaptive optical element, a reference plane being adjusted for scanning the depth direction.

Going into detail, the white light interferometer shown in FIG. 1 has a light source LQ for the emission of short coherent light (coherence length, for instance, between a few μm and a few hundred μm) via a sending optical system SO onto beam splitter ST, using which the light is split into a reference light path RL formed by a reference arm and into object light path OL formed by an object arm, and is directed, on the one hand, to reference plane R, such as a mirror, and, on the other hand, to the surface of object O. The light reflected by reference plane R and object plane O is, for example, superposed on beam splitter ST or in the further course of the light path leading to pickup element BA, and is analyzed in camera K or possibly an evaluation device AE connected to it or integrated into it, and is processed, in order to evaluate the measured data of the object surface, such as with respect to roughness. Adaptive optical element AOE, in this connection, is situated between pickup element BA and an ocular OK connected before the former, so that, using adaptive optical element AOE, a sharp image is ensured, even if scanning range lying in the depth direction (z direction) exceeds the depth of field of objective optics OB, OO. In this exemplary embodiment, the depth scanning is undertaken by moving reference R in the depth direction T, corresponding to the arrow. Furthermore, various positions 1, 2, 3 are shown in the region of the receiving optics EO, in which adaptive optical element AOE may alternatively be situated, or where there may be additional adaptive optical elements AOE.

Figure 2:
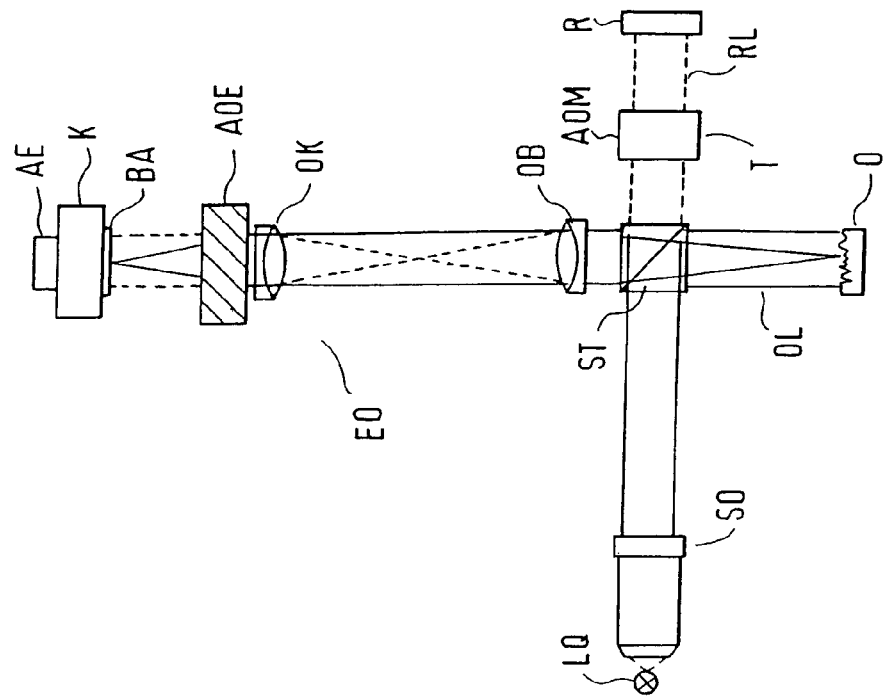
FIG. 2 shows an interferometer as in FIG. 1, the difference being that the reference light path for scanning is changed using an acousto-optical modulator.

In the exemplary embodiment shown in FIG. 2 of the white light interferometer, an acousto-optical modulator AOM is applied in reference light path RL, using which the length of reference light path RL is able to be changed alternatively or in addition to the movement of reference R for depth scanning T.

FIGS. 3 and 4 show exemplary embodiments of the white light interferometer in which one or more intermediate images ZB are generated in object light path OL. Via these intermediate images, a relatively large surface area may be scanned, even, for example in narrow, deep hollow spaces, there being the additional advantage that a surface, lying at an angle or formed differently, is first imaged in a planar manner, and then the plane intermediate image ZB is able to be scanned in a relatively simple fashion. According to FIG. 4, panoramic optical system RS is provided to object light path OL for recording a region running around by 360° of the object surface. Such structural parts having intermediate imaging are explained in greater detail in documents German patent documents nos. 100 47 495 A1, 101 31 778 A1 and 101 15 524 A1 mentioned at the outset, so that with reference to these specialties, we refer to these documents. In the present instance, using one or more acousto-optical elements AOE, imaging on pickup element BA may be improved, and a more accurate measurement may be undertaken, as was described in the above considerations.

Figure 5:
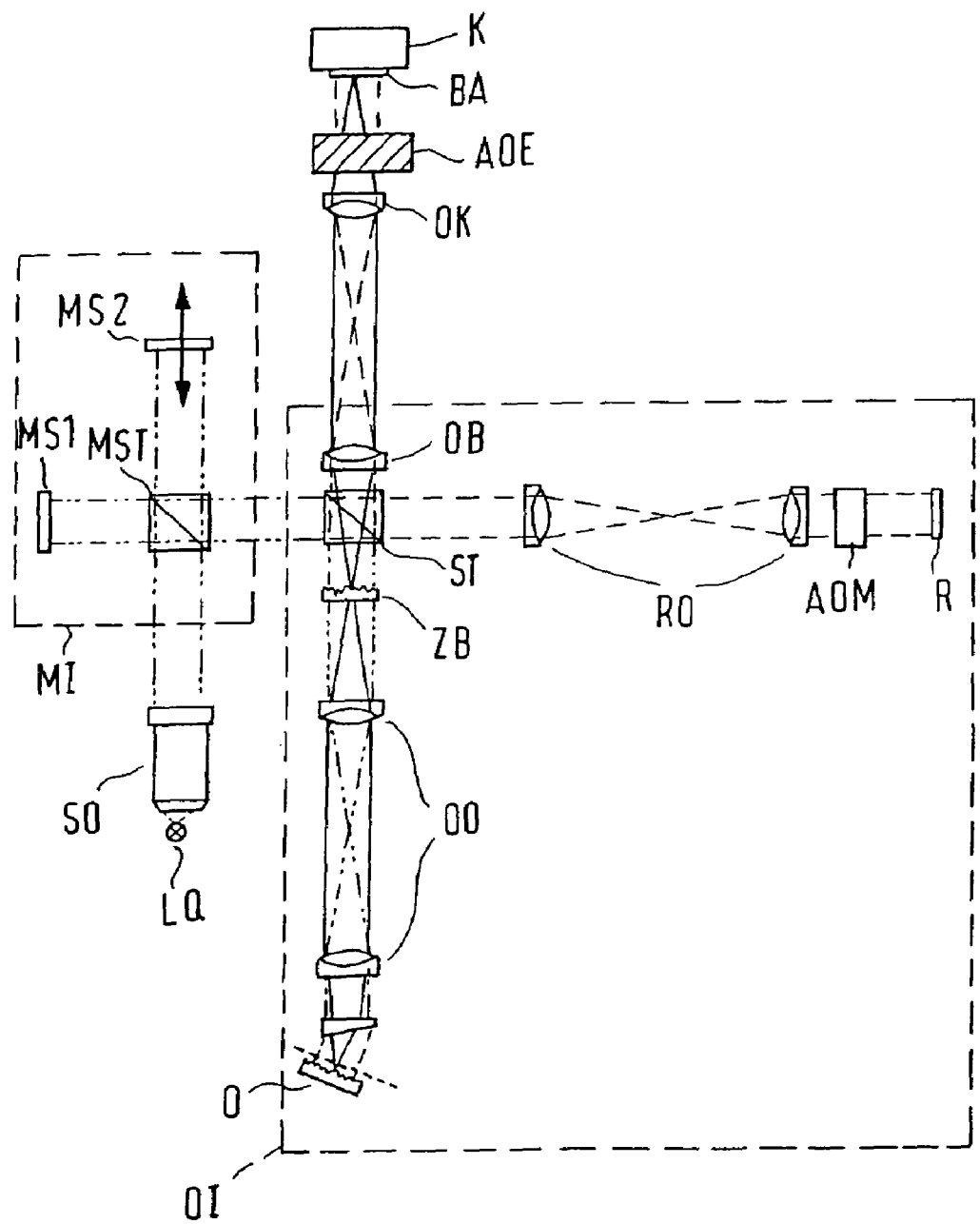
FIG. 5 shows a white light interferometer having an adaptive optical element which has a modulation interferometer and an object interferometer.
Figure 6A:
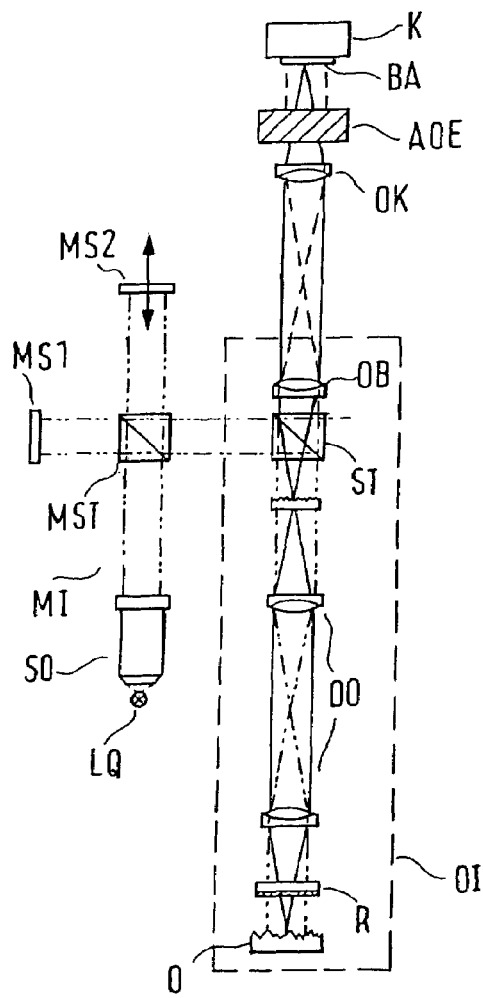
FIG. 6A shows an additional exemplary embodiments for a white light interferometer having an adaptive optical element, which have a modulation interferometer and an object interferometer, their coupling being implemented via a general-diffuse optical system or fiber optics.
Figure 6B:
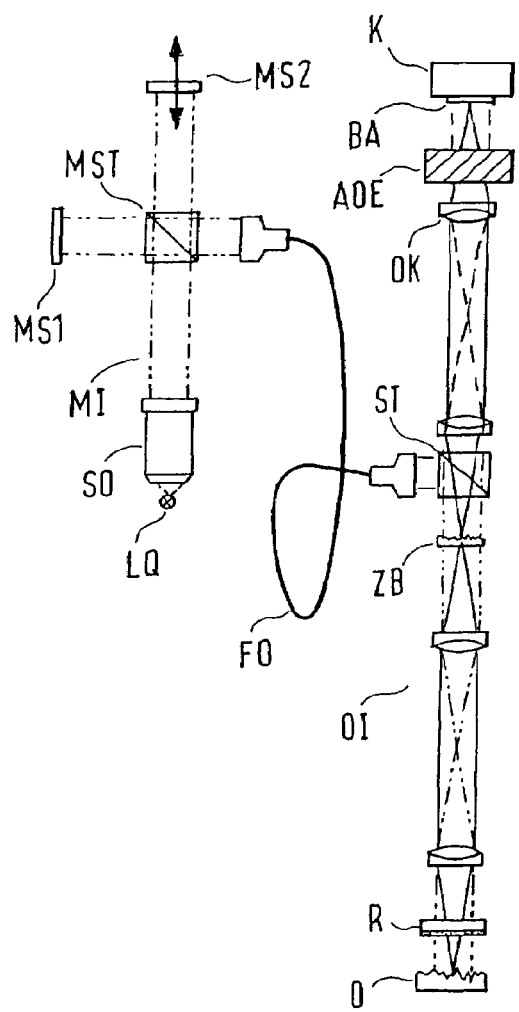
FIG. 6B shows another additional exemplary embodiments for a white light interferometer having an adaptive optical element, which have a modulation interferometer and an object interferometer, their coupling being implemented via a general-diffuse optical system or fiber optics.

FIGS. 5, 6A and 6B show various exemplary embodiments of the white light interferometer, having a modulation interferometer MI and an object interferometer OI, according to FIGS. 5 and 6A, the light coupling between the two partial interferometers taking place via a general-diffuse optical system, and in the exemplary embodiment as in FIG. 6B via fiber optics FO. In FIGS. 6A and 6B, the reference light path is formed in the object arm, whereby the aforementioned common path system comes about. In modulation interferometer MI, first an optical path difference is generated of the light guided into the two interferometer arms using beam splitter MST of modulation interferometer MI, and reflected therein using reflecting elements MS1, MS2, which is greater than the coherence length. This light is then guided out via beam splitter MST of modulation interferometer MI and conducted to beam splitter ST of object interferometer OI and, in object interferometer OI, is conducted via reference light path RL on the one hand, and object light path OL, on the other hand, and is subsequently supplied to pickup element BA and camera K for further processing, reference light path RL and object light path OL being designed in such a way that the optical path difference generated in modulation interferometer MI is set back and interfering light is obtained for the evaluation. In this instance, the depth scanning is done, for example by the displacing of reflecting optical element MS2 in modulation interferometer MI. More detailed statements on such a construction are made, for instance, in German patent documents nos. 101 31 778 A1 and 100 47 495 A1 that were named. In the case at hand, because of the at least one applied adaptive optical element AOE in the manner explained above, the imaging properties, and accordingly the signal evaluation, are improved.

Figure 7:
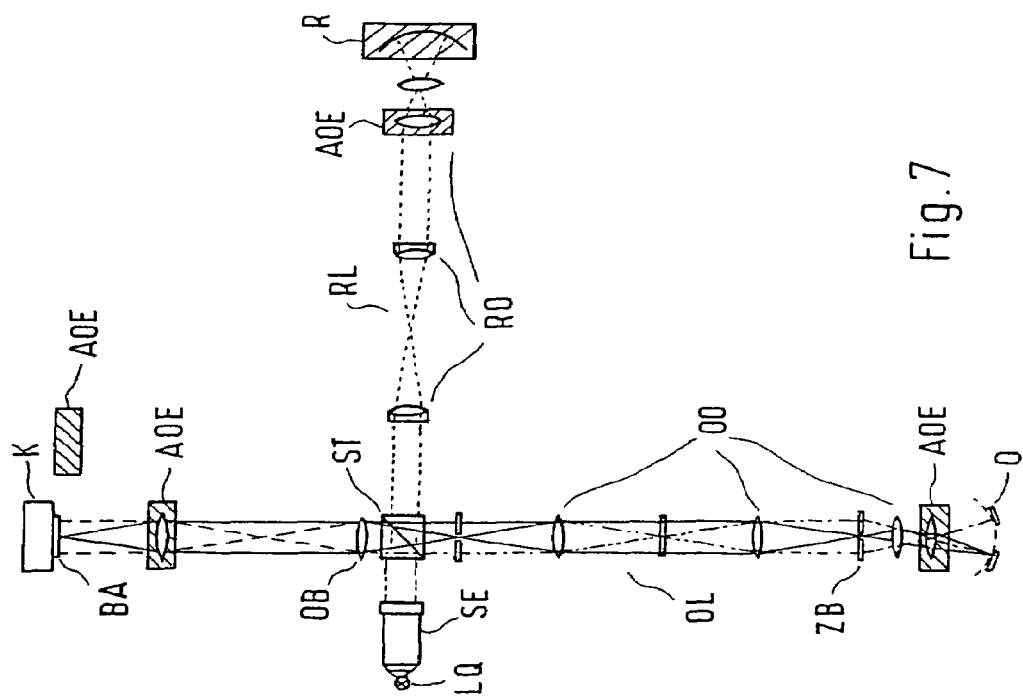
FIG. 7 shows an additional exemplary embodiment for a white light interferometer having an adaptive optical element, in which a panoramic optical system and an intermediate image are provided.

In the white light interferometer WI shown in FIG. 7, in the object side optical system OO, there is an active optical element AOE in a panoramic optical system in front of the surface of object O, and it is, for example, developed as an adaptable lens element. At least one intermediate image ZB is generated in object light path OL. In this way, an adaptation to different object surfaces may be made. To compensate for imaging errors, a corresponding adaptive optical element AOE is also situated in reference light path RL, and the reference is formed similar to the object surface. An active optical element is also situated in the light path leading to pickup element BA, for focus adjustment.

Figure 8:
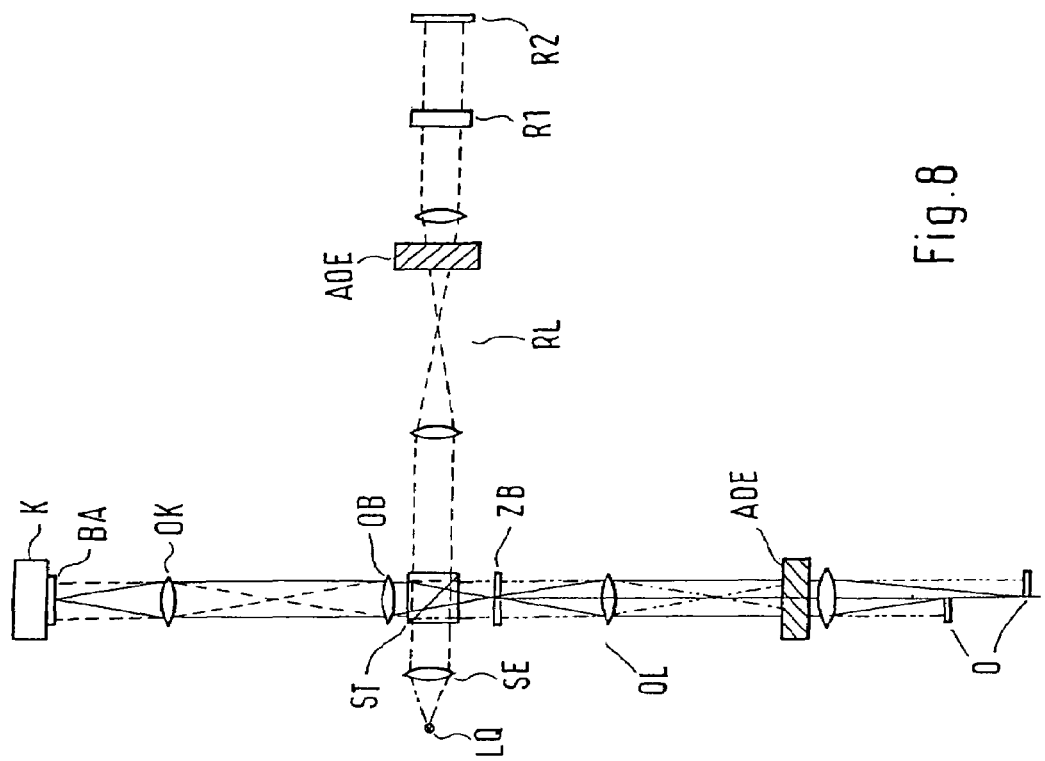
FIG. 8 shows an additional exemplary embodiment for a white light interferometer having an adaptive optical element, using which object surfaces may be scanned at various distances.

FIG. 8 shows an exemplary embodiment of a white light interferometer, in which in object light path OL there is an adaptive optical element AOE, which makes possible changing the focal length for setting to two differently deep lying surface areas of object O. In order also to adapt reference light path RL appropriately, it also has in it an adaptive optical element AOE, situated in appropriate fashion.

Figure 9:
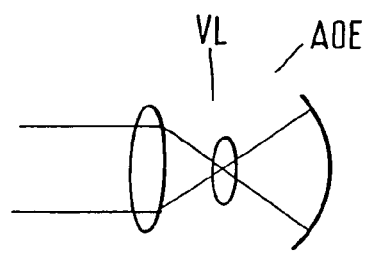
FIG. 9 shows an exemplary embodiment for lenses having variable focal lengths.
Figure 10:
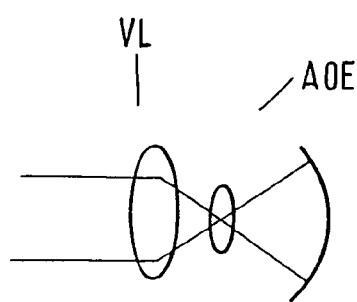
FIG. 10 shows another exemplary embodiment for lenses having variable focal lengths.

FIGS. 9 and 10 show two exemplary embodiments for a adaptive optical element AOE in the form of a lens having variable focal length, according to FIG. 9, adjustment to various distances taking place and according to FIG. 10 adjustment to different angular apertures taking place, and accordingly, two different lens elements are activated.

Figure 11:
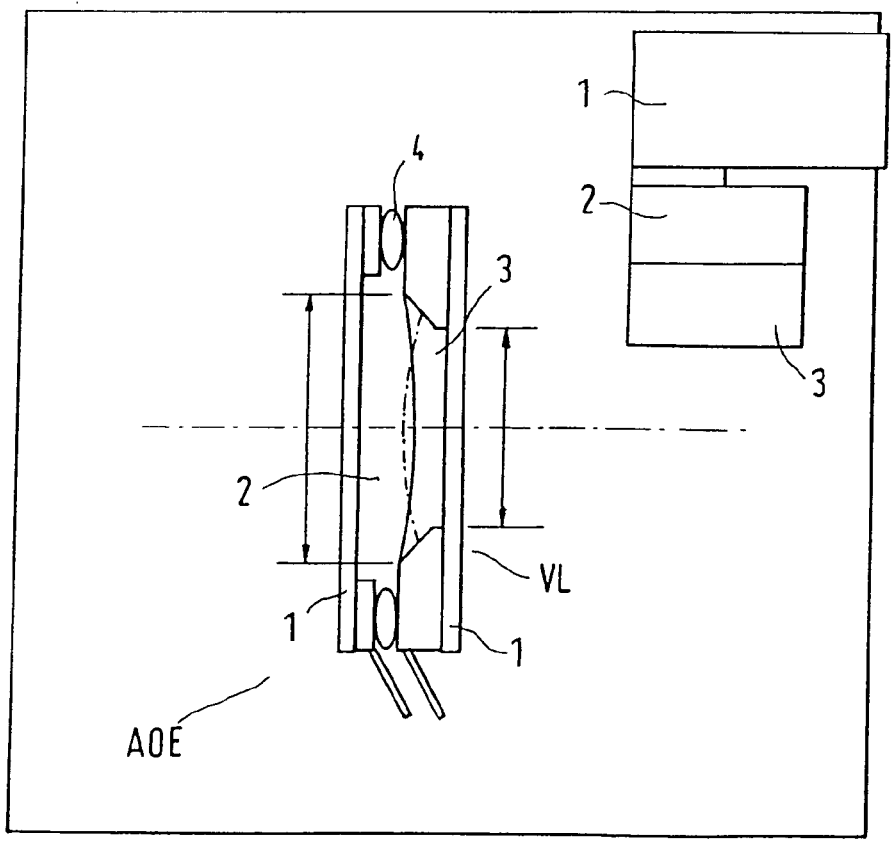
FIG. 11 shows an additional exemplary embodiment for a lens having variable focal length.

In the exemplary embodiment shown in FIG. 11 of an active optical element, a lens having a variable focal length is also involved, two immiscible fluids 2, 3 being contained in it, which, toward the outside, are closed off by a cover 1, made of glass or plastic; and a seal 4, and which are able to be activated for changing the focal length by a stress.

Figure 12A:
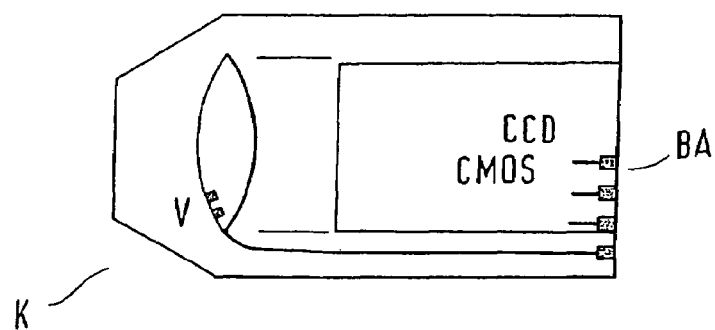
FIG. 12A shows an exemplary embodiment for adaptive optical elements in the form of an autofocus lens or an electrical zoom lens.
Figure 12B:
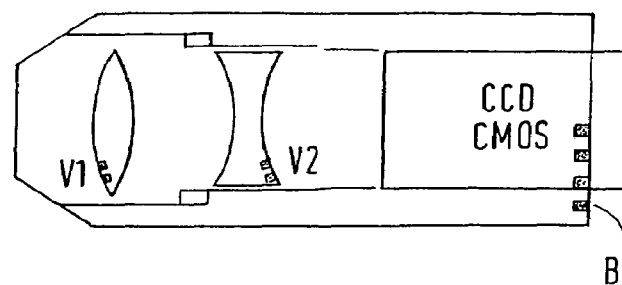
FIG. 12B shows another exemplary embodiment for adaptive optical elements in the form of an autofocus lens or an electrical zoom lens.

FIGS. 12A and 12B show exemplary embodiments for an adaptive optical element AOE that are situated in the upper end of a camera K, FIG. 12A showing an electrically activatable autofocus lens and FIG. 12B showing an electrically activatable zoom lens. Subsequent pickup element BA may be developed, for instance, in CCD technology or CMOS technology.

Figure 13:
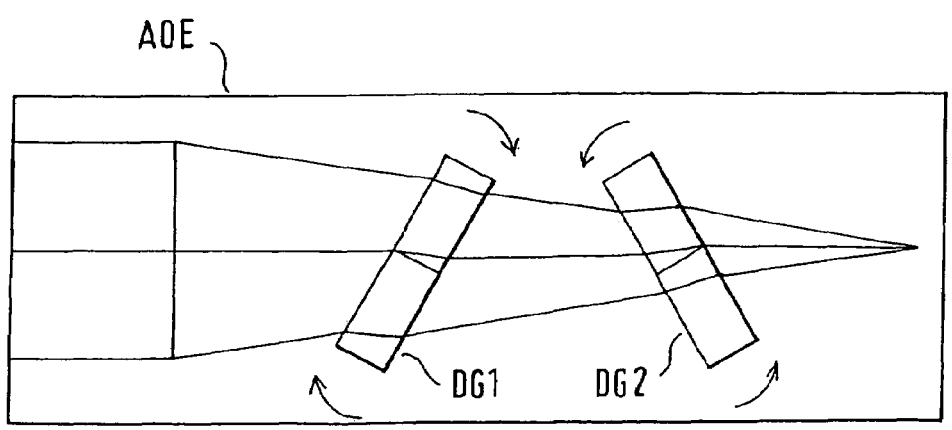
FIG. 13 shows an adaptive optical element constructed from rotatable flat slab glass.

In one additional exemplary embodiment shown in FIG. 13, of an active optical element AOE, it is formed from two flat slab glasses DG1, DG2 that are rotatable with respect to each other.

What is claimed is:

1. An interferometric measuring device, for measuring a surface shape of an object, comprising:
   a radiation source to emit a short coherent electromagnetic radiation;
   a beam splitter to form an object beam which is directed via an object light path to the object, and a reference beam which is directed via a reference light path to a reference plane;
   a pickup element by which electromagnetic radiation reflected by the object and a reference plane and brought to interference is able to be picked up; and
   at least one adaptive optical element by which at least one of an imaging of the object on the pickup element, a wave front of the reference beam, and an optical path length in the reference light path, and the object light path may be influenced;
   the at least one adaptive optical element including at least one lens; and
   at least one of the adaptive optical elements being situated between the pickup element and an ocular lens.

2. The interferometric measuring device of claim 1, wherein the pickup element includes a planar pickup element, and information of radiation reflected by the object and the reference plane, and brought to interference, is supplied to an evaluating device for determining the surface shape.

3. The interferometric measuring device of claim 1, wherein the adaptive optical element generates a sharp image of the object on the pickup element.

4. The interferometric measuring device of claim 1, wherein the adaptive optical element includes at least one of an active spatial light modulator, a liquid crystal display, a lens having a variable focus, the lens having the variable focus and which is made up of at least two immiscible fluids that are activated by a stress, and at least two counterrotating glass plates.

5. The interferometric measuring device of claim 1, wherein, using the adaptive optical element, different object regions are able to be sharply imaged one after another which at least partly lie outside a depth of field ranges of an objective or ocular of an imaging optical system.

6. The interferometric measuring device of claim 1, wherein the adaptive optical element is readjusted during a depth scan so that the object region, in which the virtual reference plane lies, is sharply imaged.

7. The interferometric measuring device of claim 1, wherein there is an optical system for generating at least one intermediate image in the object light path.

8. The interferometric measuring device of claim 7, wherein the optical system that generates the intermediate image includes an endoscope.

9. The interferometric measuring device of claim 1, wherein, in the reference light path, to compensate for dispersion, glass or a same optical system as the optical system generating the intermediate image is inserted.

10. The interferometric measuring device of claim 8, wherein the endoscope or one of the adaptive optical elements, which is constructed as an autofocus system, enables sharp imaging of the object region to be measured.

11. The interferometric measuring device of claim 1, wherein the optical system on the object side includes a panoramic optical system for imaging a region of the object running around by 360°.

12. The interferometric measuring device of claim 11, wherein an intermediate image of the object is generatable using the panoramic optical system.

13. The interferometric measuring device of claim 11, wherein the panoramic optical system includes at least one adaptive optical element or is made up of it, or the panoramic optical system includes a combination of lenses having at least one adaptive optical element.

14. The interferometric measuring device of claim 1, wherein at least one adaptive optical element is inserted into the reference light path by which a shape of the reference plane is able to be changed.

15. The interferometric measuring device of claim 1, wherein the adaptive optical element in the reference light path includes at least one lens having a variable focus, which has at least two immiscible fluids and which is activatable via a stress, a curved mirror, a mirror having a curvature that may be modulated, or a combination of these components.

16. The interferometric measuring device of claim 1, further comprising:
   a modulation interferometer to generate the depth scan; and
   an object interferometer that is separate from the modulation interferometer.

17. The interferometric measuring device of claim 1, wherein the adaptive optical element includes at least one of an ocular lens situated before the pickup element, an autofocus system, and a zoom system.

18. The interferometric measuring device of claim 1, wherein different image planes are generatable simultaneously using the adaptive optical element.

* * * * *